(12) United States Patent
Yeh

(10) Patent No.: US 11,630,532 B2
(45) Date of Patent: Apr. 18, 2023

(54) TOUCH SENSITIVE PROCESSING APPARATUS AND METHOD THEREOF AND TOUCH SYSTEM

(71) Applicant: EGALAX_EMPIA TECHNOLOGY INC., Taipei (TW)

(72) Inventor: Shang-Tai Yeh, Taipei (TW)

(73) Assignee: EGALAX_EMPIA TECHNOLOGY INC., Taipei (TW)

(*) Notice: Subject to any disclaimer, the term of this patent is extended or adjusted under 35 U.S.C. 154(b) by 0 days.

(21) Appl. No.: 17/318,135

(22) Filed: May 12, 2021

(65) Prior Publication Data
US 2021/0373730 A1  Dec. 2, 2021

(30) Foreign Application Priority Data
May 27, 2020  (TW) .................. 109117811

(51) Int. Cl.
  *G06F 3/041* (2006.01)
  *G06F 3/044* (2006.01)
  *G06F 3/0354* (2013.01)

(52) U.S. Cl.
  CPC ...... *G06F 3/04162* (2019.05); *G06F 3/03545* (2013.01); *G06F 3/0441* (2019.05); *G06F 3/0442* (2019.05); *G06F 3/04166* (2019.05)

(58) Field of Classification Search
  CPC ............. G06F 3/04162; G06F 3/03545; G06F 3/04166; G06F 3/0441; G06F 3/0442
  See application file for complete search history.

(56) References Cited

U.S. PATENT DOCUMENTS

| | | | | |
|---|---|---|---|---|
| 9,785,260 B2* | 10/2017 | Chang | .................. | G06F 3/0442 |
| 9,851,816 B2* | 12/2017 | Chang | .................. | G06F 3/0383 |
| 10,514,782 B2* | 12/2019 | Tseng | .................... | G06F 3/0442 |
| 11,243,644 B2* | 2/2022 | Ju | ........................ | G06F 3/04166 |
| 2002/0158851 A1* | 10/2002 | Mukai | ................. | G06F 3/04883 |
| | | | | 345/173 |
| 2016/0209944 A1* | 7/2016 | Shim | ................... | G06F 3/04166 |
| 2016/0252981 A1* | 9/2016 | Chang | .................. | G06F 3/0446 |
| | | | | 345/179 |
| 2017/0131798 A1* | 5/2017 | Geaghan | ............... | G06F 3/0441 |
| 2017/0153763 A1* | 6/2017 | Vavra | .................... | G06F 3/0442 |
| 2017/0308186 A1* | 10/2017 | Yamamoto | ............. | G06F 3/038 |
| 2019/0102021 A1* | 4/2019 | Jang | ...................... | G06F 3/0383 |

(Continued)

FOREIGN PATENT DOCUMENTS

CN  111033453  4/2020

*Primary Examiner* — Benyam Ketema
(74) *Attorney, Agent, or Firm* — WPAT, PC

(57) ABSTRACT

A touch sensitive processing method, comprising: transmitting a beacon signal via multiple electrodes of a touch panel; in a first period after the transmission of the beacon signal, receiving first electrical signals from N styli via the electrodes sequentially; in an i-th time slot of an j-th time period after the transmission of the beacon signal, receiving an j-th electrical signals from the N styli via the electrodes if the first electrical signal of the i-th stylus is received in the first period; and in the i-th time slot of the j-th time period after the transmission of the beacon signal, performing other detections if the first electrical signal of the i-th stylus is received in the first period, where $1 \Leftarrow i \Leftarrow N$, $2 \Leftarrow j \Leftarrow M$, N and M are positive integers which are larger or equaling to 2, respectively, i and j are positive integers.

24 Claims, 14 Drawing Sheets

(56) References Cited

U.S. PATENT DOCUMENTS

| | | | |
|---|---|---|---|
| 2020/0050339 A1* | 2/2020 | Choi | G06F 3/0383 |
| 2020/0174589 A1 | 6/2020 | Hara et al. | |
| 2020/0201505 A1* | 6/2020 | Jung | G06F 3/0414 |
| 2020/0210021 A1* | 7/2020 | Ju | G06F 3/0442 |
| 2021/0096709 A1* | 4/2021 | Yeh | G06F 3/04166 |
| 2021/0124449 A1* | 4/2021 | Jang | G06F 3/0412 |
| 2021/0200345 A1* | 7/2021 | Chang | G06F 3/0383 |
| 2021/0200404 A1* | 7/2021 | Kim | G06F 3/0412 |
| 2021/0373730 A1* | 12/2021 | Yeh | G06F 3/0441 |
| 2021/0373731 A1* | 12/2021 | Yeh | G06F 3/0442 |

\* cited by examiner

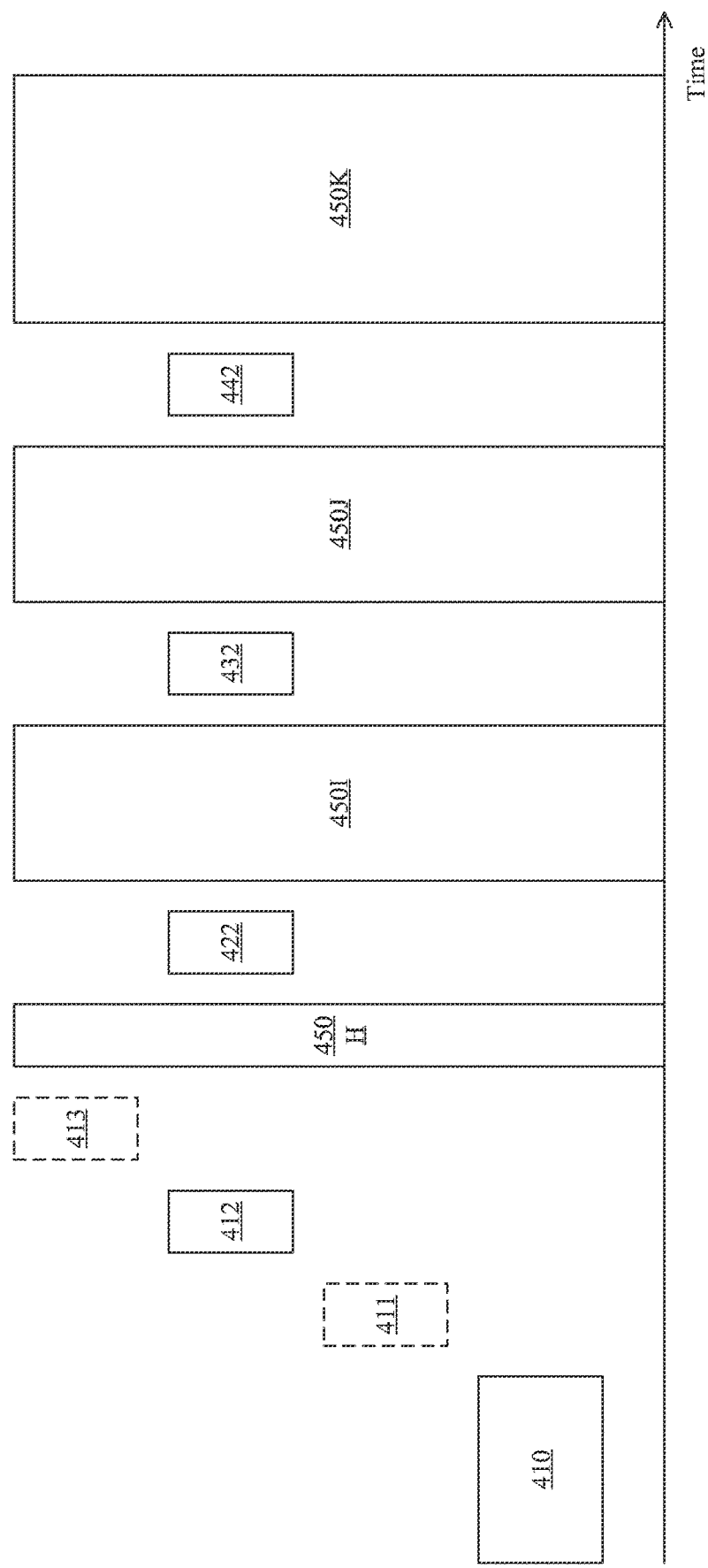

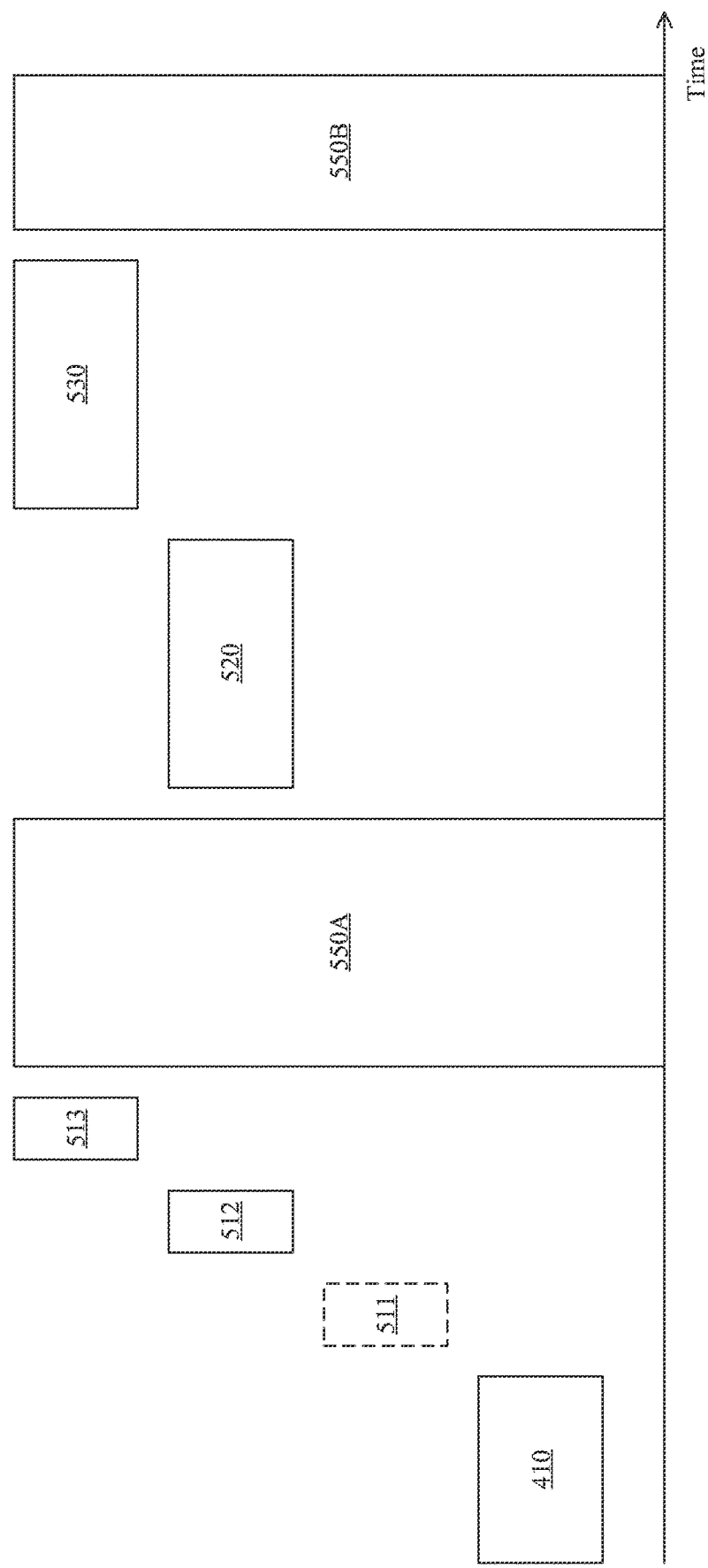

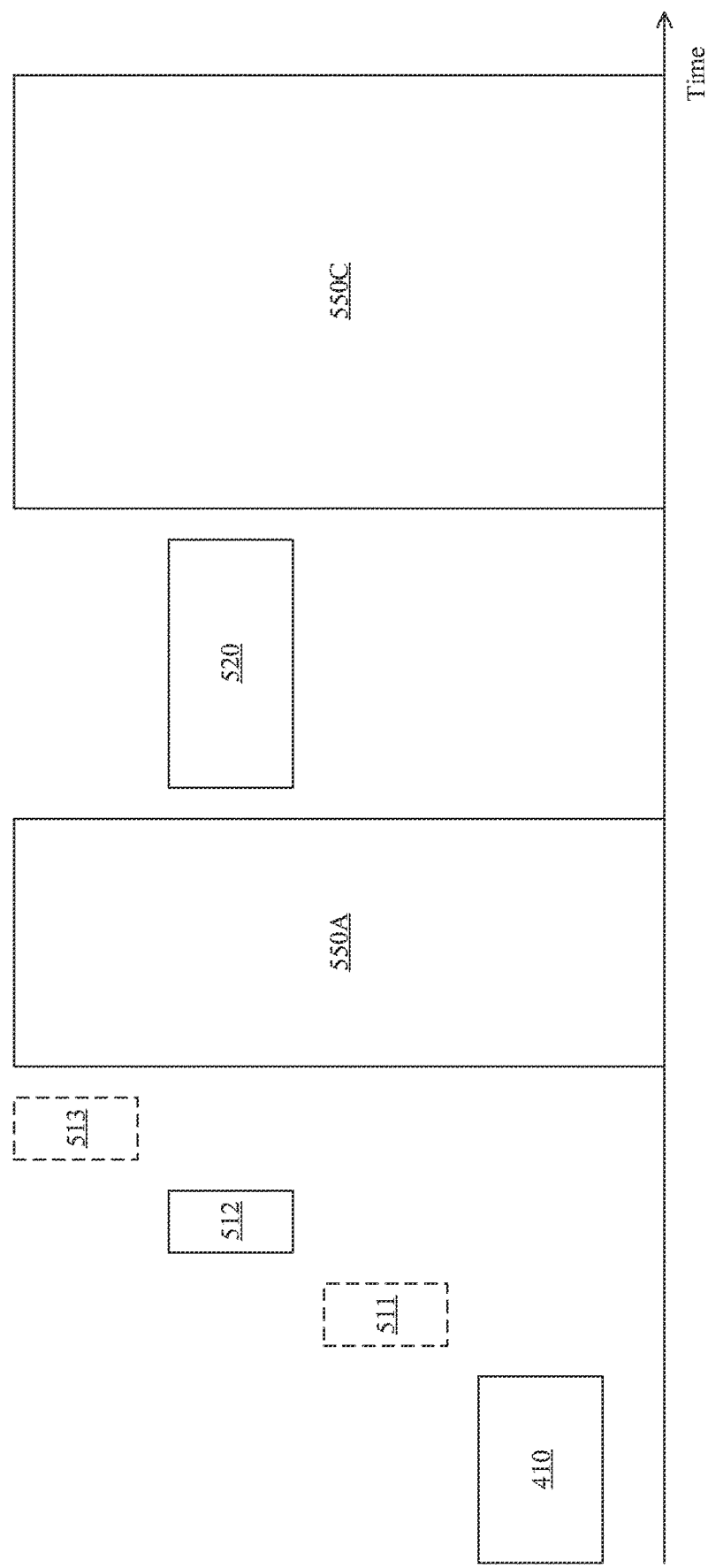

TOUCH SENSITIVE PROCESSING APPARATUS AND METHOD THEREOF AND TOUCH SYSTEM

CROSS REFERENCE TO RELATED PATENT APPLICATION

This patent application is based on a Taiwan, R.O.C. patent application No. 109117811 filed on May 27, 2020.

FIELD OF THE INVENTION

The present invention relates to touch sensitive system, and more particularly, to touch sensitive system including stylus.

BACKGROUND OF THE INVENTION

There are growing applications of stylus in a touch sensitive system, especially the stylus actively emits electrical signals can enable operating on touch panel or screen precisely by user. When sizes of touch panels or screens are growing, the touch system may allow more than one styli operating.

However, users demand higher performance of touch sensitive systems, i.e., user requires quicker touch responses. In other words, in a unit of time, touch sensitive processing apparatus has to increase quantity of reports of approximating or touching events caused by styli and external conductive objects, i.e., reporting rate. When number of operating active styli increases, how to raise the reporting rate of approximating or touching events is the primary issue the present application intends to deal with.

SUMMARY OF THE INVENTION

According to an embodiment of the present invention, a provided touch sensitive processing method comprising: transmitting beacon signals via touch electrodes of a touch panel; during a first time period after the transmitting of the beacon signals, receiving sequentially and respectively first electrical signals from N styli via the touch electrodes; when the first electrical signals of an i-th stylus among the N styli is received during the first time period, respectively receiving an j-th electrical signals of the i-th stylus via the touch electrodes during an i-th time slot of an j-th time period after the transmitting of the beacon signals; and when the first electrical signals of the i-th stylus among the N styli is received during the first time period, respectively performing other kinds of detections during the i-th time slot of the j-th time period, where $1 \Leftarrow i \Leftarrow N$, $2 \Leftarrow j \Leftarrow M$, N and M are positive integers equal to or larger than 2, i and j are positive integers.

According to an embodiment of the present invention, a provided touch sensitive processing method comprising: transmitting beacon signals via touch electrodes of a touch panel; during an indicating time period after the transmitting of the beacon signals, receiving sequentially and respectively existence signals from N styli via the touch electrodes; when the existence signal of an i-th stylus among the N styli is received during the indicating time period, respectively receiving electrical signals of the i-th stylus during an i-th time period after the transmitting of the beacon signals; and when the existence signal of the i-th stylus is not received during the indicating time period, respectively performing other kinds of detections during the i-th time slot, where $1 \Leftarrow i \Leftarrow N$, N is a positive integer equal to or larger than 2, i is a positive integer.

According to an embodiment of the present invention, a provided touch sensitive processing apparatus, comprising: a driving circuit, configured for transmitting beacon signals via touch electrodes of a touch panel; a sensing circuit, configured for receiving electrical signals from a stylus via the touch electrodes; and an embedded processor, coupled to the driving circuit and the sensing circuit, configured for executing instructions stored in non-volatile memory in order to realize following steps: transmitting beacon signals via the touch electrodes by the driving circuit; during a first time period after the transmitting of the beacon signals, receiving sequentially and respectively first electrical signals from N styli via the touch electrodes by the sensing circuit; when the first electrical signals of an i-th stylus among the N styli is received during the first time period, respectively receiving an j-th electrical signals of the i-th stylus via the touch electrodes during an i-th time slot of an j-th time period after the transmitting of the beacon signals; and when the first electrical signals of the i-th stylus among the N styli is received during the first time period, respectively performing other kinds of detections during the i-th time slot of the j-th time period, where $1 \Leftarrow i \Leftarrow N$, $2 \Leftarrow j \Leftarrow M$, N and M are positive integers equal to or larger than 2, i and j are positive integers.

According to an embodiment of the present invention, a provided touch sensitive processing apparatus, comprising: a driving circuit, configured for transmitting beacon signals via touch electrodes of a touch panel; a sensing circuit, configured for receiving electrical signals from a stylus via the touch electrodes; and an embedded processor, coupled to the driving circuit and the sensing circuit, configured for executing instructions stored in non-volatile memory in order to realize following steps: transmitting beacon signals via the touch electrodes by the driving circuit; during an indicating time period after the transmitting of the beacon signals, receiving sequentially and respectively existence signals from N styli via the touch electrodes by the sensing circuit; when the existence signal of an i-th stylus among the N styli is received during the indicating time period, respectively receiving electrical signals of the i-th stylus during an i-th time period after the transmitting of the beacon signals; and when the existence signal of the i-th stylus is not received during the indicating time period, respectively performing other kinds of detections during the i-th time slot, where $1 \Leftarrow i \Leftarrow N$, N is a positive integer equal to or larger than 2, i is a positive integer.

According to an embodiment of the present invention, a provided touch sensitive system, comprising: the aforementioned touch sensitive processing apparatus and the touch panel.

According to an embodiment of the present application, a provided stylus processing method, comprising: receiving beacon signals via a tip electrode of a stylus; and during an i-th time slot of an j-th time period after the beacon signals are received, transmitting an j-th electrical signals via the tip electrode, where $1 \Leftarrow j \Leftarrow M$, M is a positive integer equals to or larger than 2, j is a positive integer and i is a positive integer.

According to an embodiment of the present application, a provided stylus processing method, comprising: receiving beacon signals via a tip electrode of a stylus; during an i-th time slot of an indicating time period after the beacon signals are received, transmitting an existence signal via the tip electrode; and during an i-th time period after the beacon signals are received, transmitting electrical signals via the tip electrode, where i is an positive integer.

According to an embodiment of the present application, a provided stylus, comprising: a tip electrode; a receiving circuit, coupled to the tip electrode for receiving beacon signals; a transmitting circuit, coupled to the tip electrode for transmitting electrical signal; and a processor, coupled to the receiving circuit and the transmitting circuit, configured for executing instructions stored in non-volatile memory for realizing following steps: receiving beacon signals via a tip electrode of a stylus; and during an i-th time slot of an j-th time period after the beacon signals are received, transmitting an j-th electrical signals via the tip electrode, where $1 \Leftarrow j \Leftarrow M$, M is a positive integer equals to or larger than 2, j is a positive integer and i is a positive integer.

According to one embodiment of the present application, a provided stylus, comprising: a tip electrode; a receiving circuit, coupled to the tip electrode for receiving beacon signals; a transmitting circuit, coupled to the tip electrode for transmitting electrical signal; and a processor, coupled to the receiving circuit and the transmitting circuit, configured for executing instructions stored in non-volatile memory for realizing following steps: receiving beacon signals via a tip electrode of a stylus; during an i-th time slot of an indicating time period after the beacon signals are received, transmitting an existence signal via the tip electrode; and during an i-th time period after the beacon signals are received, transmitting electrical signals via the tip electrode, where i is an positive integer.

In summarized, the stylus and processing method thereof provided by the present application is capable of transmitting multiple times of electrical signals in a cycle such that the touch sensitive processing apparatus can determine whether it needs to detect follow-on electrical signals of the stylus in a later time period according to whether the first electrical signals of the stylus is received or not. If the first electrical signals of the stylus are not received, it turns the time period for the follow-on electrical signals detection to for other kinds of detections in order to increase utilization rate of the touch sensitive system, e.g., increase detection rate or report rate with regard to external conductive objects.

BRIEF DESCRIPTION OF THE DRAWINGS

The advantages and spirit related to the present invention can be further understood via the following detailed description and drawings.

FIG. 4D shows a timing diagram of signals in accordance with an embodiment of the present invention.

FIG. 5B shows a timing diagram of signals in accordance with an embodiment of the present invention.

FIG. 5C shows a timing diagram of signals in accordance with an embodiment of the present invention.

DETAILED DESCRIPTION OF THE PREFERRED EMBODIMENT

Figure 1:
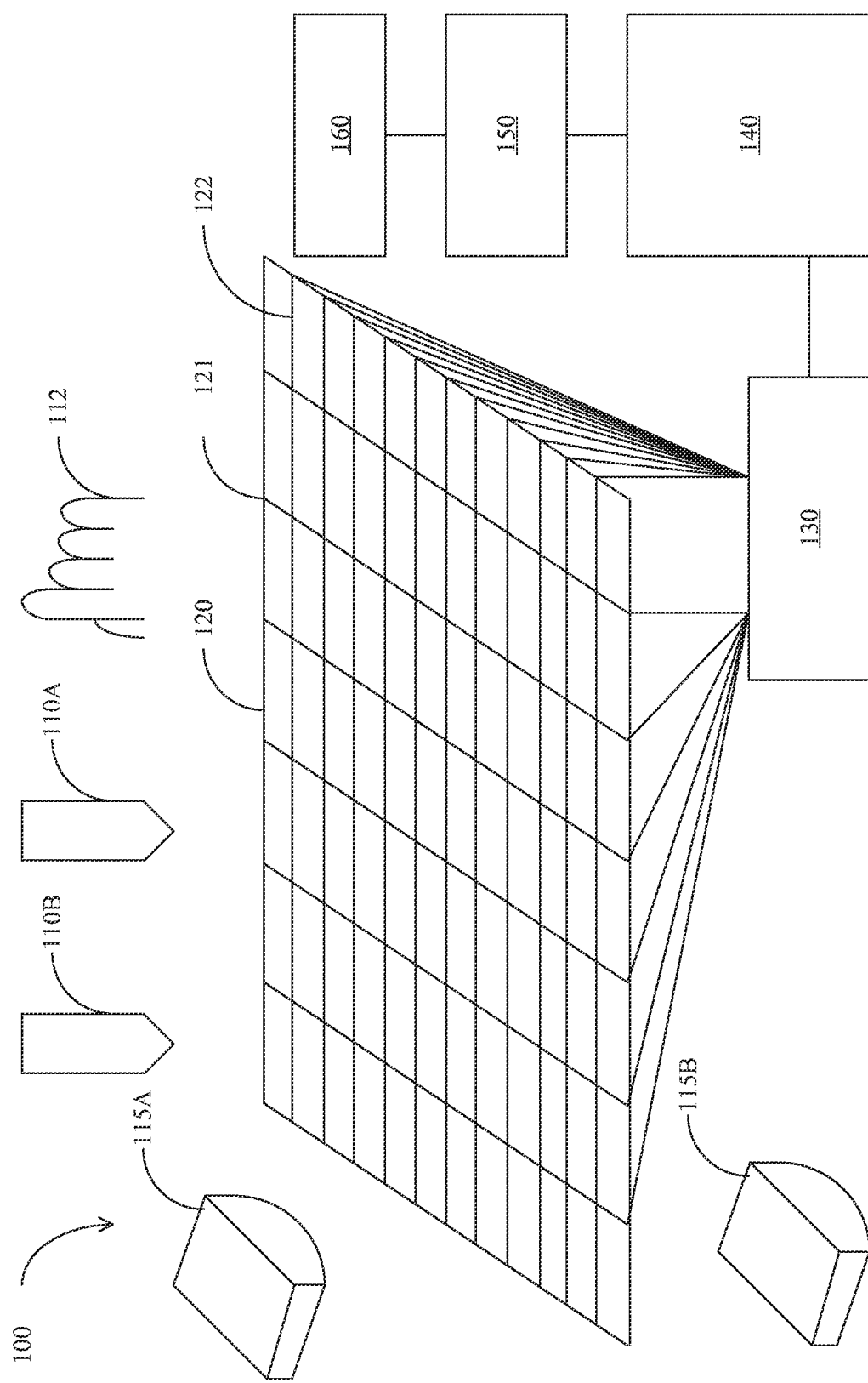
FIG. 1 shows a diagram of a touch sensitive system 100 in accordance with an embodiment of the present invention.

Some embodiments of the present application are described in details below. However, in addition to the description given below, the present invention can be applicable to other embodiments, and the scope of the present invention is not limited by such rather by the scope of the claims. Moreover, for better understanding and clarity of the description, some components in the drawings may not necessary be drawn to scale, in which some may be exaggerated related to others, and irrelevant. If no relation of two steps is described, their execution order is not bound by the sequence as shown in the flowchart diagram.

Please refer to FIG. 1, which shows a diagram of a touch sensitive system 100 in accordance with an embodiment of the present invention. The touch sensitive system 100 includes a host including an apparatus controlling whole operations of the touch sensitive system 100, e.g. a central processing unit, memories and interfaces for connecting peripheral input and output devices. The interfaces may include industrial standard interfaces such as PCI, PCI-e, SATA, ATA, USB and UART or proprietary interfaces. Via the interface, the host 140 connects to a display processing apparatus 150 which in turn connects to a display 160. Also through the interface, the host connects to a touch sensitive processing apparatus 130 which is coupled to a transparent touch panel 120 constituted by multiple touch electrodes and is responsible for detecting external conductive object (e.g. hand 112), styli 110A and 110B, electronic board erasers 115A and 115B and etc. approximating or touching the touch panel 120. The transparent touch panel 120 comprises multiple first electrodes in parallel to a first axis and multiple second electrodes in parallel to a second axis. The transparent touch panel 120 may directly attach to the display 160 or the touch panel 120 and the liquid crystal display 160 may be integrated together as an embedded touch panel. The present invention does not limit how the transparent touch panel 120 and the display 160 bind together. In an embodiment, the touch panel 120 and the display 160 are collectively named as a touch screen 120.

The central processing unit of the host 140 may execute instructions and data stored in non-volatile memory for running an operating system and applications. Following instructions of the operating system and applications, the host 140 and the display processing apparatus 150 may singularly or collectively control displays of the display 160 or the touch screen 120. In the present invention considers the host 140 takes control of display. When the host 140 runs some applications, a drawing area would be shown on the touch screen 120. When the stylus 110A or 110B inputs in the drawing area, a marked trace corresponding to the input of the stylus 110A or 110B would be shown in the drawing area. Displayed content of the marked trace would be changed in response to the inputs of the stylus 110A or 110B. Similarly, when the electronic board eraser 115A or 115B inputs in the drawing area, an erasing area corresponding to the input of the electronic board eraser 115A or 115B would be created in the drawing area. Displayed content of the erasing area would be changed in response to the inputs of the electronic board eraser 115A or 115B.

Figure 2:
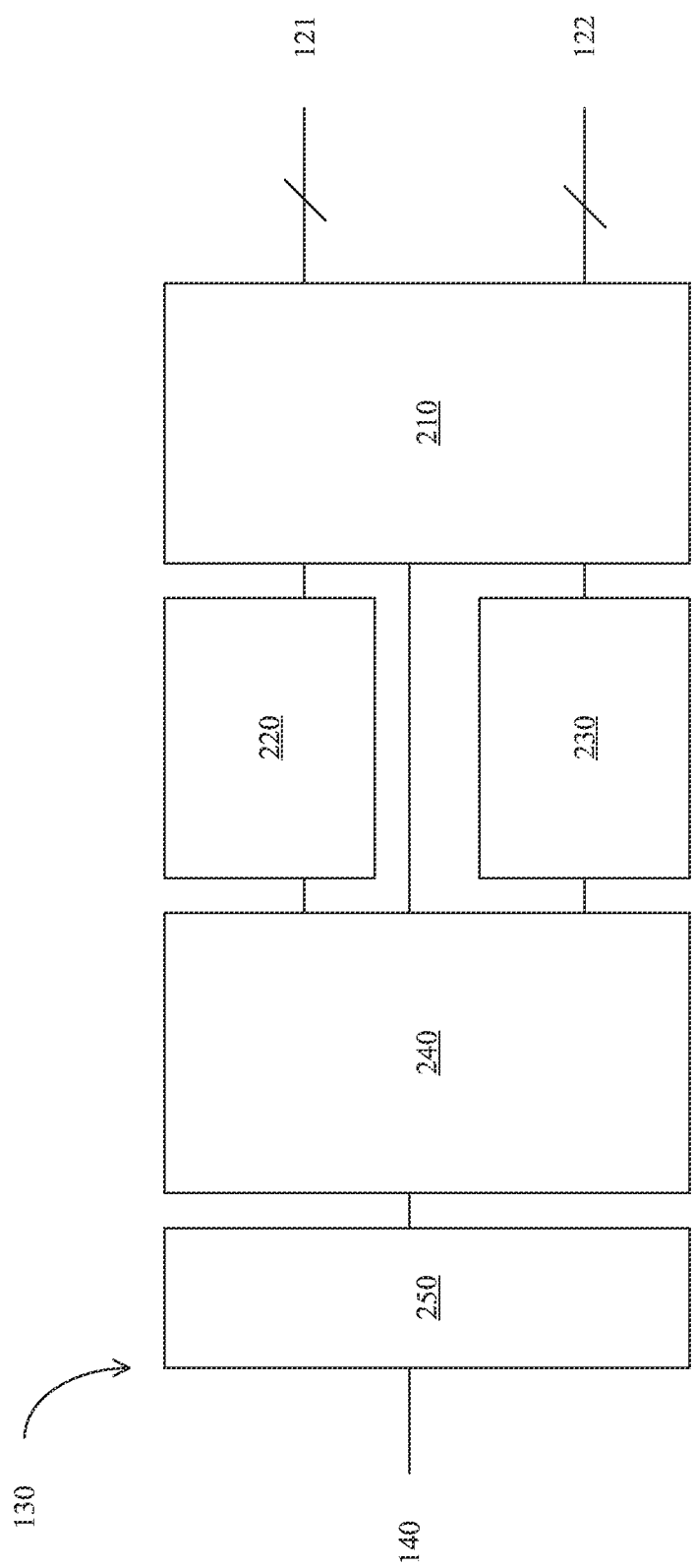
FIG. 2 depicts a block diagram of a touch sensitive processing apparatus 130 in accordance with an embodiment of the present invention.

Please refer to FIG. 2, which depicts a block diagram of a touch sensitive processing apparatus 130 in accordance with an embodiment of the present invention. The touch sensitive processing apparatus 130 comprises an embedded processor 240 configured for connecting and controlling an interconnection network 210, a driving circuit 220, a sensing circuit 230 and a host interface 250. The driving circuit 220 may be configured to connect to each one of the first electrodes 121 and each one of the second electrodes 122 via the interconnection network 210 for emitting driving signals via the connected electrodes. The sensing circuit 230 may be configured to connect to each one of the first electrodes 121 and each one of the second electrodes 122 via the interconnection network 210 for sensing signals via the connected electrodes. The embedded processor 240 may communicate with the host 140 via the host interface 250. The embedded processor may execute program module stored in non-volatile memory for detecting the approximating or touching objects and events.

Figure 3:
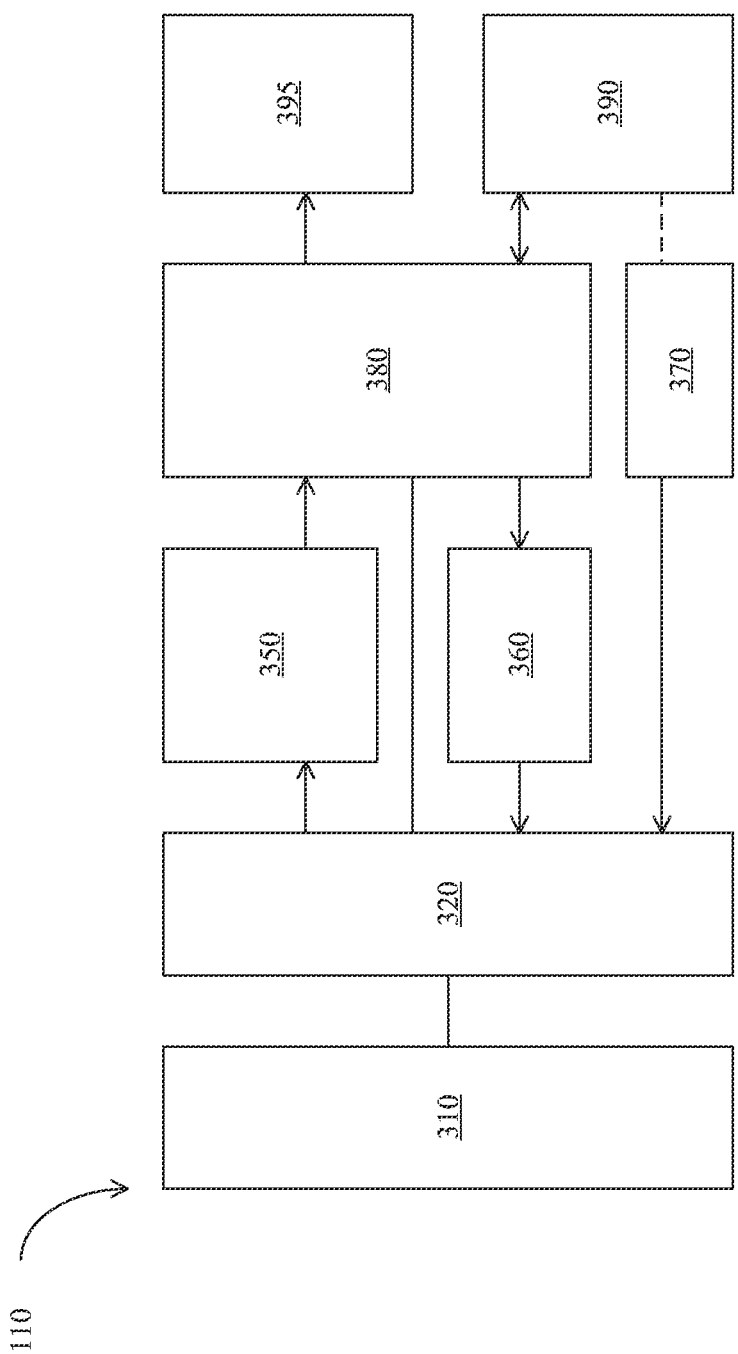
FIG. 3 illustrates a block diagram of a stylus 110 in accordance with an embodiment of the present invention.

Please refer to FIG. 3, which illustrates a block diagram of a stylus 110 in accordance with an embodiment of the present invention. The stylus 110 may include a power module 310 which may comprise a battery or a capacitor for supplying power of the stylus 110. One end of the stylus may include a tip electrode 390. At least one ring electrode 395 may be placed around the tip electrode 390 for encircling the tip electrode 390. The tip electrode 390 and the ring electrode 395 may emit electrical signals in a time-sharing manner or simultaneously. The touch sensitive processing apparatus 130 may detect the electrical signals via the first electrodes 121 and the second electrodes 122 of the touch panel 120 and calculate a tip electrode position and a ring electrode position of the stylus 110. Thus an axis of the stylus 110 projecting on the touch panel 120 and an tilt angle between the touch panel 120 and the stylus 110 are calculated according to the tip electrode position and the ring electrode position.

The stylus 110 may comprise a multiplexer 380, a receiving circuit 360, a transmitting circuit 350 and a processor 320. The multiplexer 380 may connect to the tip electrode 390 and the ring electrode 395. The touch sensitive processing apparatus 130 transmits beacon signals to the stylus 110 via the first electrodes 121 and the second electrodes 122 of the touch panel 120. When the stylus 110 receives the beacon signals, the multiplexer 380 is configured to connect to the tip electrode 390. The receiving circuit 360 receives the beacon signals via the multiplexer 380 and the tip electrode 390. After the beacon signals are received, the receiving circuit 360 notifies the processor 320 for following process.

When the stylus 110 transmits electrical signal, the multiplexer 380 is configured to receive the tip electrode 390 and/or the ring electrode 395. The transmitting circuit 350 can transmit the electrical signals to the touch panel 120 via the tip electrode 390 and the ring electrode 395 simultaneously or in a time-sharing manner. The stylus 110 may further comprise a force sensor 370 connects to the tip electrode 390 for sensing pressure force received by the tip electrode 390. The pressure force value received by the force sensor 370 may send to the processor 320. The electrical signals may be modulated by the processor 320 in accordance with the received pressure force value, such that the touch sensitive processing apparatus can generate the sensed force value according to the demodulated electrical signals.

Although the force sensor 370 senses pressure in digital form, the present invention may use the mechanisms disclosed in the U.S. Pat. No. 9,581,816 and its continuations and continuations-in-part application which the outputted electrical signals are modulated directly by the force sensor.

In one embodiment of the present application, the touch sensitive system 100 may comprise multiple styli 110. Each of the styli 110 may be assigned a number which may be a natural number including 1. User can learn the assigned number of a particular stylus 110 via a human-machine interface of the stylus 110 or any other suitable mechanism. User may also set the number of the particular stylus 110 via the human-machine interface of the stylus 110 or any other suitable mechanism. The number may be stored in a memory of the stylus 110. The processor 320 may access the memory for reading the number.

When the touch sensitive system 100 comprises styli 110 with different numbers, these styli 110 may take turns to transmit electrical signals in a time-sharing manner according to their assigned number. A fundamental timing point of the time-sharing manner is related to beacon signals transmitted via the touch panel 120 from the touch sensitive processing apparatus 130. When the beacon signals are received, the processor 320 of the stylus 110 would transmit electrical signals during a time period corresponding to its assigned number. It means that when two styli 110 with different assigned numbers operate in the same touch sensitive system 100, there is no chance for these two styli 110 transmitting electrical signals concurrently.

Figure 4A:
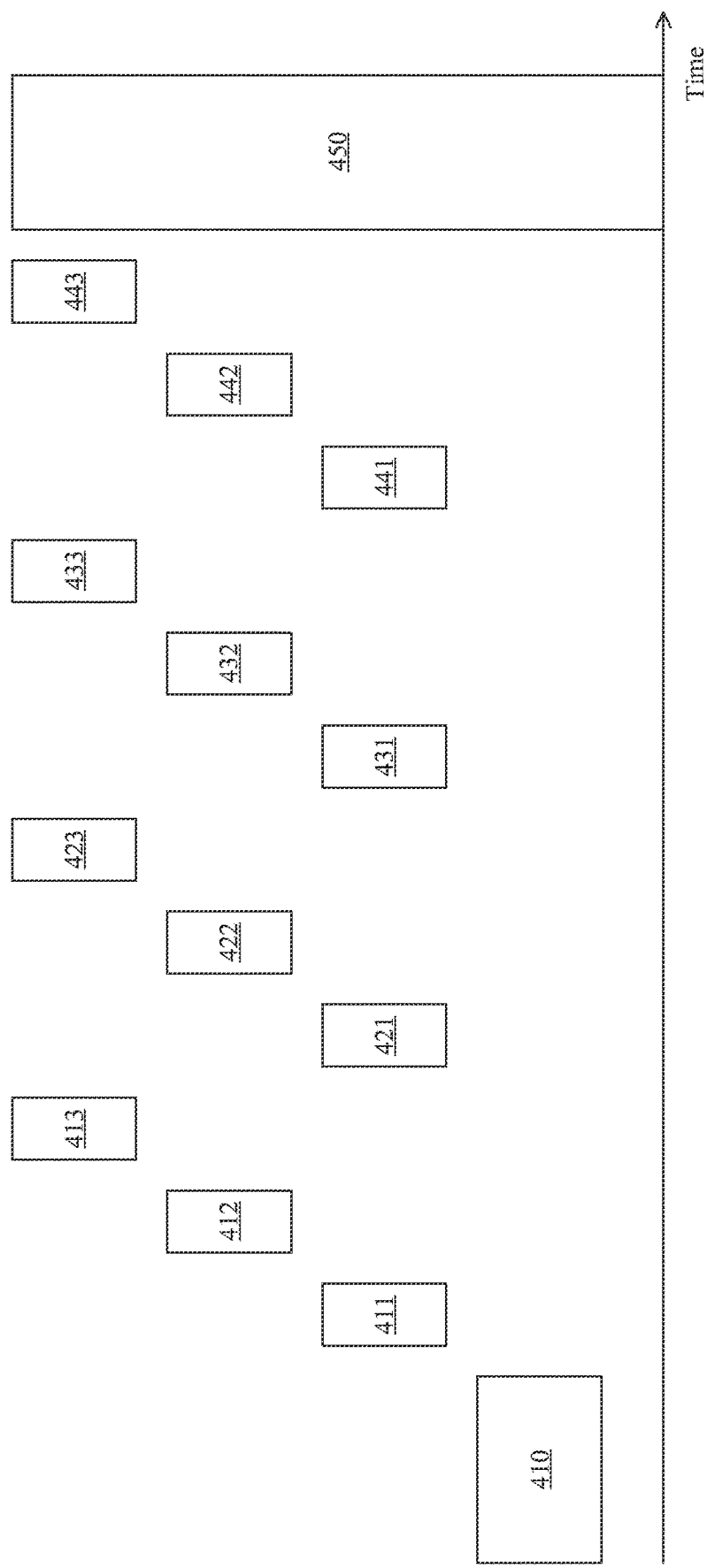
FIG. 4A shows a timing diagram of signals in accordance with an embodiment of the present invention.

Please refer to FIG. 4A, which shows a timing diagram of signals in accordance with an embodiment of the present invention. The touch sensitive system 100 is designed for operating N styli 110, where N is a natural number equals to or is larger than 2. In the embodiment as shown in FIG. 4A, N is configured as 3, i.e., the touch sensitive system 100 is allowed to operate with three styli 110. After the beacon signals are received, each stylus 110 does not just emit electrical signals at once but emit M times of signals, where M is a natural number equals to or is larger than 2. In the embodiment as shown in FIG. 4A, M is configured as 4.

Block 410 represents that the touch sensitive processing apparatus 130 transmits beacon signals via the first electrodes 121 and/or the second electrodes of the touch panel 120. The first stylus 110A is assigned as number 1. After the beacon signals are received, its processor 320 would transmit electric signals in a first slot of four time periods respectively according to the assigned number 1. As shown in FIG. 4A, the first stylus 110A transmits a first, a second, a third and a fourth electrical signals during the time slots 411, 421, 431, and 441. The present application does not limit the modulations and the content of the electrical signals transmitted in these time slots. The present application does not limit which electrodes transmit the electrical signals. For example, the first electrical signals and the second electrical signals may include different contents and they can be transmitted via the ring electrode 395 and the tip electrode 390, respectively.

Likely, the second stylus 110B is assigned as number 2. After the beacon signals are received, its processor 320 would transmit electric signals in a second slot of four time periods respectively according to the assigned number 2. As shown in FIG. 4A, the second stylus 110B transmits a first, a second, a third and a fourth electrical signals during the time slots 412, 422, 432, and 442. And so on, the third stylus 110C is assigned as number 3. After the beacon signals are received, its processor 320 would transmit electric signals in a third slot of four time periods respectively according to the assigned number 3. As shown in FIG. 4A, the third stylus 110C transmits a first, a second, a third and a fourth electrical signals during the time slots 413, 423, 433, and 443. After these time slots, the touch processing apparatus 130 may perform detections for other objects during a time period denoted as block 450.

When the touch sensitive system 110 is designed to operate N styli and each of the styli transmits electrical signals in M times after receiving the beacon signals, the touch sensitive processing apparatus 130 would receive electrical signals in N×M time slots after the beacon signals are transmitted. As shown in FIG. 4A, there are 12 time slots after the beacon signals are transmitted. Since each stylus 110 transmits M times of electrical signal in each cycle, at most M positions of each stylus 110 can be reported during each cycle.

However, in case that there are styli 110 fewer than N operating, the touch sensitive processing apparatus 130 can use these empty slots for other kinds of detection. For examples, detection of external conductive objects using mutual-capacitance and/or self-capacitance mechanisms, determination of whether conductive liquid cover large area of the touch panel 120, detection of environmental interferences, or even power saving sleep. In this present application, the other kinds of detections are collectively referred as external conductive object detection. However person having ordinary skill in the art can understand the time period for external conductive object detection can be used for other kinds of detections.

Figure 4B:
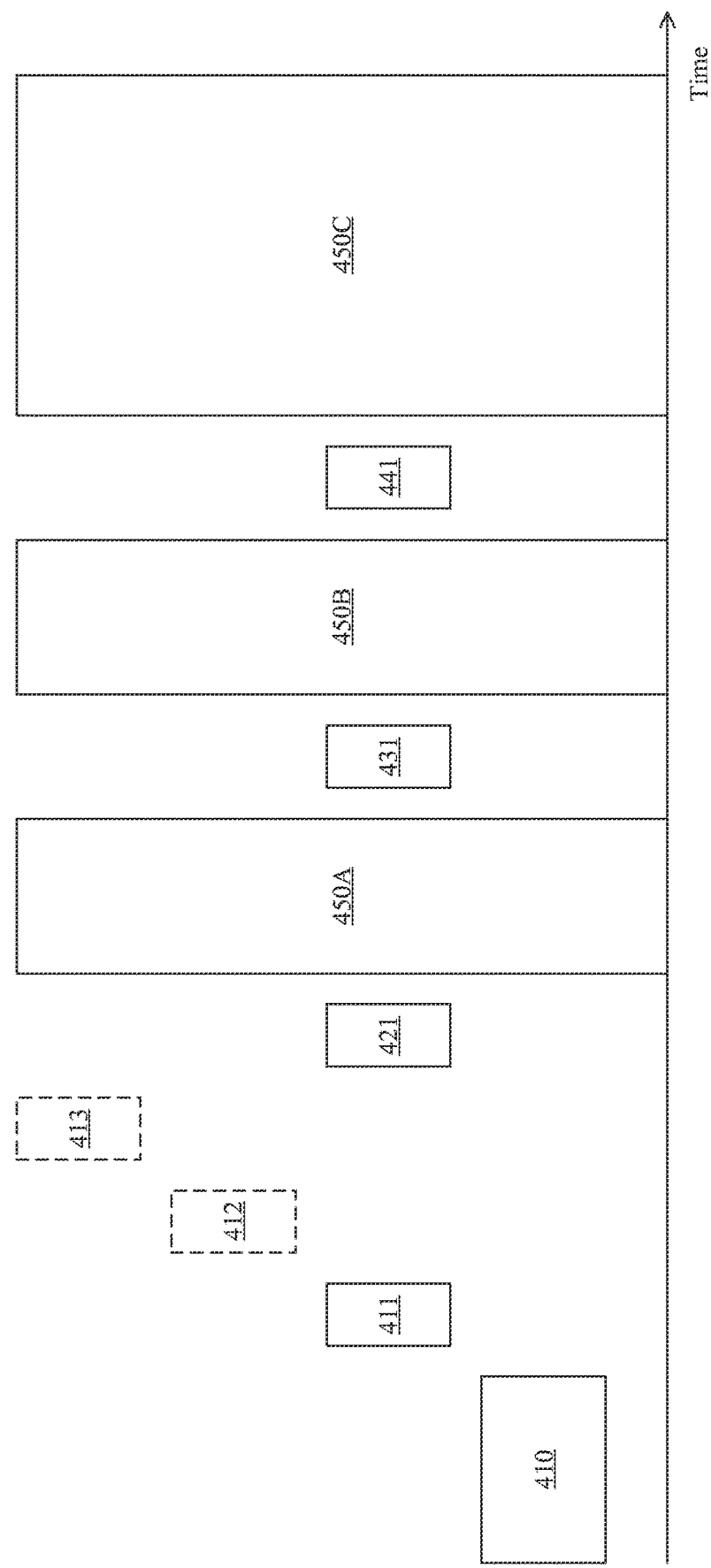
FIG. 4B shows a timing diagram of signals in accordance with an embodiment of the present invention.

Please refer to FIG. 4B, which depicts a timing diagram of signals in accordance with an embodiment of the present invention. Comparing with the embodiment as shown in FIG. 4A, the embodiment as shown in FIG. 4B shows only one stylus 110A, the second stylus 110B and the third stylus 110C are absent. The touch sensitive processing apparatus 130 does not detect the first electrical signals during the time slots corresponding to the blocks 412 and 413. Hence, the touch sensitive processing apparatus 130 only detects the electrical signals emitted from the first stylus 110A during the time slots 421, 431 and 441 and perform other kinds of detections during the time slots 422, 432, 442, 423, 433 and 443.

There may exists turnaround periods between the time slots, continuous time periods may be merged by the turnaround periods and adjacent time slots by the touch sensitive processing apparatus 130 for performing other kinds of detections. For example, the time slots 422 and 423 and their turnaround period may be merged as a period 450A for other kinds of detections, and the time slots 432 and 433 and their turnaround period may be merged as a period 450B for other kinds of detections. In addition to their turnaround period, the time slots 442 and 443 may further be merged with the time period 450 for forming a longer continuous time period 450C. Therefore, the touch sensitive processing apparatus 130 can determine the kind of detection during the following time slots to detect electrical signals transmitted from stylus 110 or other kinds of detection according to the three time slots 411, 412 and 413 of the first time period.

Figure 4C:
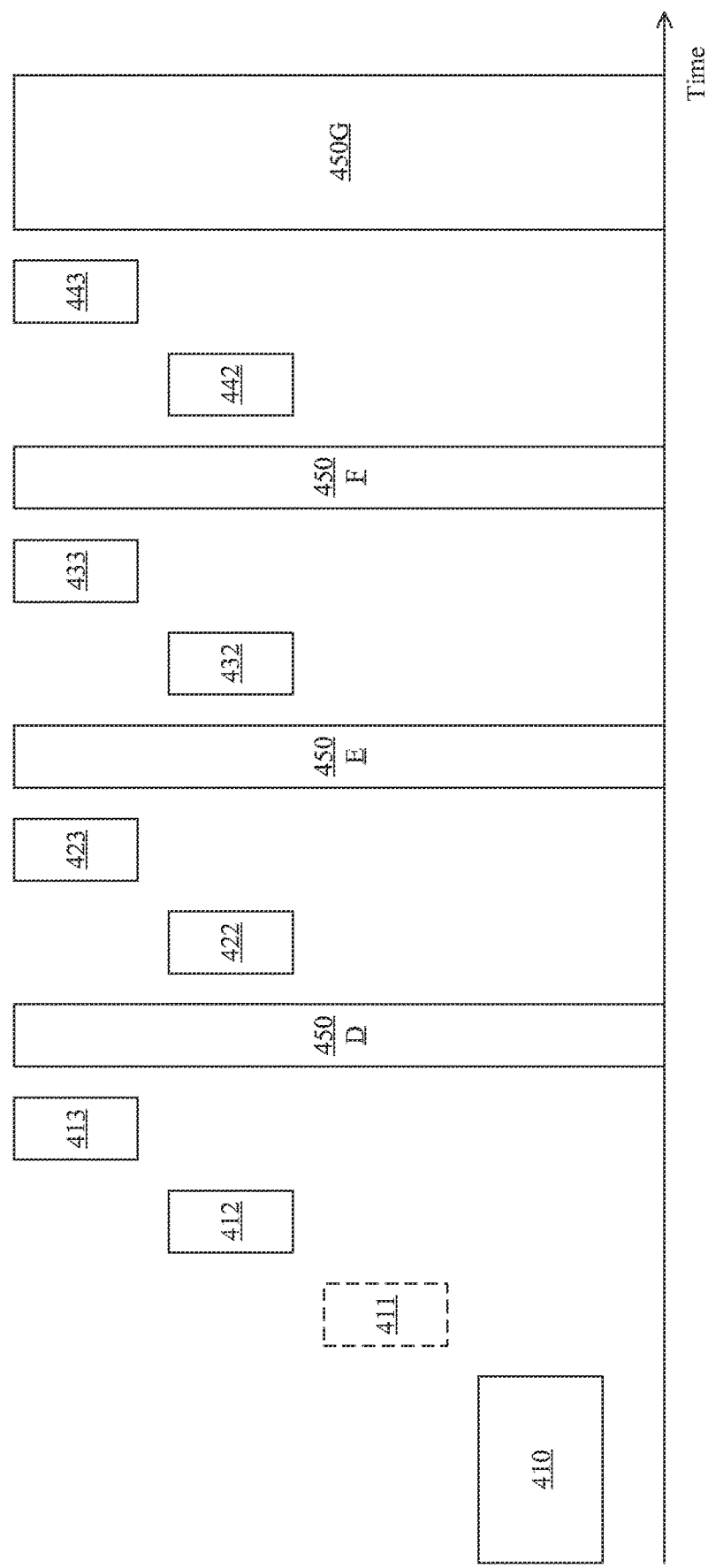
FIG. 4C shows a timing diagram of signals in accordance with an embodiment of the present invention.

Please refer to FIG. 4C, which illustrates a timing diagram of signals in accordance with an embodiment of the present invention. Comparing with the embodiment as shown in FIG. 4A, the embodiment as shown in FIG. 4C does not include the first stylus 110A but the second stylus 110B and the third stylus 110C. Hence, when the first electrical signals from the first stylus 110A is not received during the time slot 411, the touch sensitive processing apparatus 130 would turn the original time slots 421, 431 and 441 to periods 450D, 450E and 450F for other kinds of detections, respectively.

Please refer to FIG. 4D, which illustrates a timing diagram of signals in accordance with an embodiment of the present invention. Comparing with the embodiment as shown in FIG. 4A, the embodiment as shown in FIG. 4D only comprise only the second stylus 110B, the first stylus 110A and the third stylus 110C are not included. Hence, when the first electrical signals from the first stylus 110A and from the third stylus 110C are not received during the time slots 411 and 413, respectively, the touch sensitive processing apparatus 130 would turn the time slots reserved originally for the first stylus 110A and the third stylus 110C to periods 450H, 450I and 450J for other kinds of detections. The last time slot 443 would be merged with the original time period 450 as a time period 450K for other kinds of detections.

In the embodiments as shown in FIGS. 4A-4D, the stylus 110 transmits M times of electrical signals during a cycle to increase updating rate. However, the touch sensitive processing apparatus 130 is required to use relatively complicated methods to turn unused time slots and turnaround periods into periods for other kinds of detections. In an alternative embodiment, the stylus 110 may transmit electrical signals twice in a cycle. The first electrical signals is used to present existence of the stylus 110, and the second electrical signals is used to present status of the stylus 110. In preferred embodiments, a period for the electrical signals of presenting existence may be shorter. Another period for electrical signals for presenting status may be longer for carrying more information. However, the present application does not limit modulation methods and time period lengths of these two electrical signals.

Figure 5A:
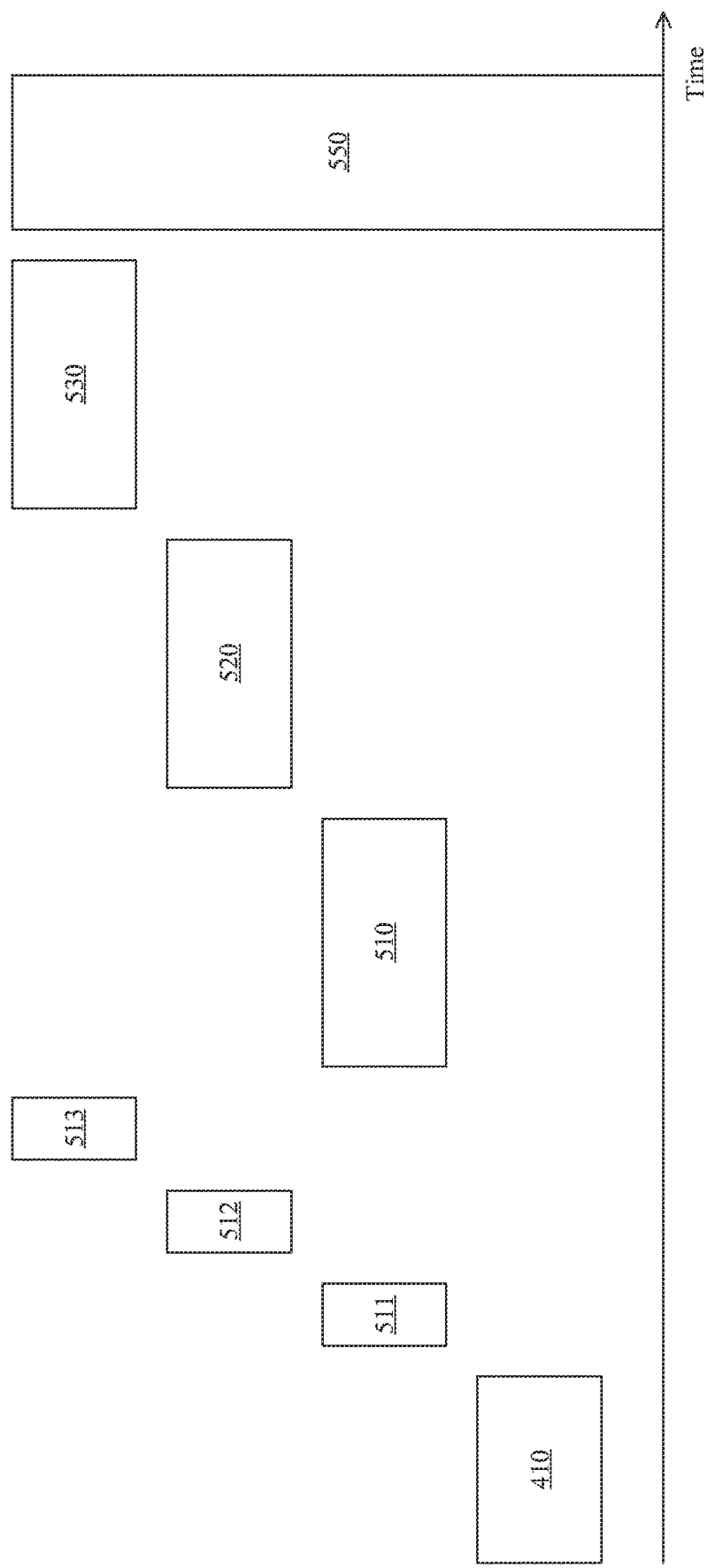
FIG. 5A shows a timing diagram of signals in accordance with an embodiment of the present invention.

Please refer to FIG. 5A, which shows a timing diagram of signals in accordance with an embodiment of the present invention. After receiving the beacon signals during the time period 410, the first stylus 110A transmits an existence signal during the time slot 511. Next, the second stylus 110B and the third stylus 110C transmit existence signals during the time slots 512 and 513, respectively. The time slots 511, 512 and 513 can form an indicating time period. The touch sensitive processing apparatus 130 can determine whether the styli 110A-110C exists according to these three time slots, respectively. When existence signal is detected in the corresponding time slot, the touch sensitive processing apparatus 130 would perform electrical signals of stylus in the corresponding time period; otherwise, other kinds of detections would be performed during the corresponding time period.

The styli 110A-110C transmit electrical signals to represent onboard status during the time periods 510, 520 and 530, respectively. According to the assigned number, the stylus 110 would transmit electrical signals during a corresponding time period after the beacon signals is received. In a cycle, the touch sensitive processing apparatus 130 may perform other kinds of detection during the time period 550 after the electrical signal time periods corresponding to the styli.

Please refer to FIG. 5B, which depicts a timing diagram of signals in accordance with an embodiment of the present invention. Comparing with the embodiment as shown in FIG. 5A, the touch sensitive processing apparatus 130 as shown in FIG. 5B only receive existence signal from the second stylus 110B during the time slot 512. Hence, the time period 510 originally reserved for the electrical signals from the first stylus 110A is turned to a time period 550A for other kinds of detection.

Please refer to FIG. 5C, which depicts a timing diagram of signals in accordance with an embodiment of the present invention. Comparing with the embodiment as shown in FIG. 5A, the touch sensitive processing apparatus 130 as shown in FIG. 5C only receive existence signal from the second stylus 110B during the time slot 512. Hence, the time period 510 originally reserved for the electrical signals from the first stylus 110A is turned to a time period 550A for other kinds of detection. The time period 530 originally reserved for the electrical signals from the third stylus 110C is turned to a time period 550C for a time period 550C for other kinds of detection along with turnaround period and the time period 550.

Person having ordinary skill in the art can understand that although the periods for other kinds of detection are behind one of time slot for receiving electrical signals from the styli in the embodiments as shown in FIGS. 4A-5, the present application does not limit the order of the transmission period of beacon signals, the electrical signals transmission time period/slot of the styli and the time periods for other kinds of detections. The present application requires that the electrical signals transmission time period/slot of the styli should be placed behind the transmission period of beacon signals. Besides, the time periods of electrical signals transmissions from the styli should be placed behind the time periods of existence signals transmissions.

Figure 6:
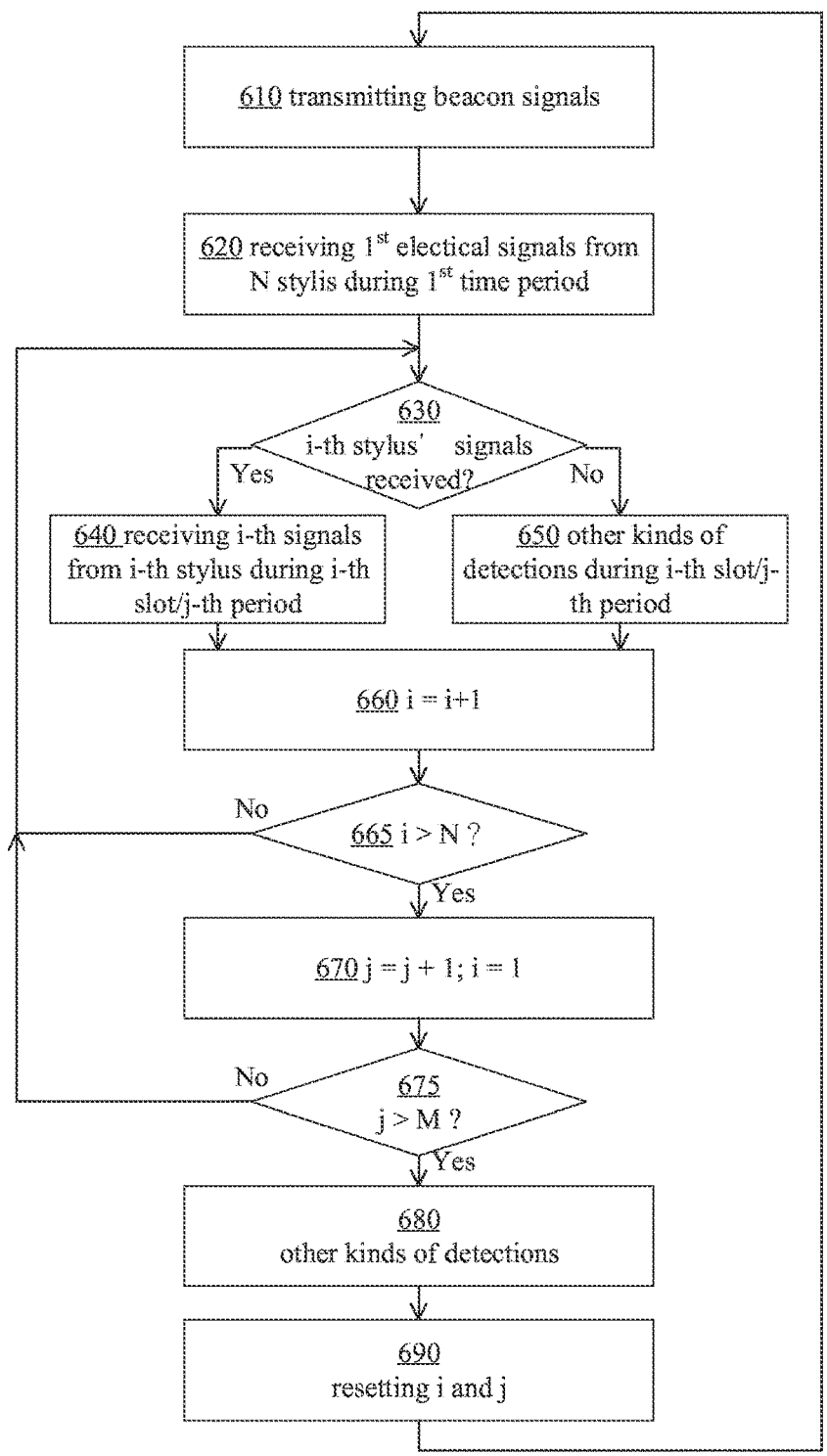
FIG. 6 depicts a flowchart diagram of a touch sensitive processing method 600 in accordance with an embodiment of the present invention.

Please refer to FIG. 6, which depicts a flowchart diagram of a touch sensitive processing method 600 in accordance with an embodiment of the present invention. The touch sensitive processing method 600 may be applied to the touch sensitive processing apparatus 130 as shown in FIG. 2. In one embodiment, it may be a program stored in non-volatile memory and being executed by the embedded processor 240. If there is no causal relation between any given two steps, the present invention does not limit execution order of these two steps.

The touch sensitive processing method 600 begins with step 610 or 690. Embodiments as shown in FIGS. 4A-4D may be referenced herein. When the touch sensitive processing method 600 is realized, two variables of positive integers, i and j, are maintained. The variable i denotes a number assigned to a stylus, and the variable j denotes the sequential number of time period, where $1 \Leftarrow i \Leftarrow N$ and $2 \Leftarrow j \Leftarrow M$, N is a positive number equals to or being larger than 2, M is also a positive number equals to or being larger than 2. Initial value of the variable i is 1. Initial value of the variable j is 2.

Step 610: transmitting beacon signals from the driving circuit 220 via the first electrodes 121 and/or the second electrodes 122 of the touch panel 120.

Step 620: receiving first electrical signals by the receiving circuit 230 from the N styli during N time slots in a first period. The first time period may comprise time slots 411, 412, 413 and/or turnaround period as shown in FIGS. 4A-4D.

Step 630: determining whether the first electrical signals from the i-th stylus during the i-th time slot are received. If the first electrical signals are received, the flow goes to step 640; otherwise, the flow proceeds to step 650.

Step 640: receiving electrical signals from the i-th stylus during the i-th slot of j-th time period.

Step 650: performing other kinds of detections during the i-th slot of the j-th time period.

Step 660: increasing the value of the variable i by 1. Next, the flow proceeds to a determination step 665.

Step 665: determining whether the value of the variable i is larger than N. If so, detection modes during the N time slots of the j-th time periods are already decided, the flow proceeds to step 670. Otherwise, it represents that not all of the detection modes during the time slots in the j-th time periods are decided, the flow returns to step 630.

Step 670: increasing the value of the variable j by 1 and resetting the value of the variable i to its initial value.

Step 675: determining whether the value of the variable j is larger than M. If the result is yes, all detection modes during all time periods are already decided, the flow proceeds to step 680. Otherwise, it represents that detection modes during the time slots of the j-th time period are not decided, the flow returns to step 630.

Step 680: performing other kinds of detections. As described above, the other kinds of detections include one or any combination of followings: using mutual-capacitance and/or self-capacitance mechanisms for detecting external conductive object, detecting whether conductive liquid covers larger area of the touch panel 120, detecting environmental interference and power saving sleep.

Step 690: resetting the variables i and j for restoring their values to their initial values.

Figure 7:
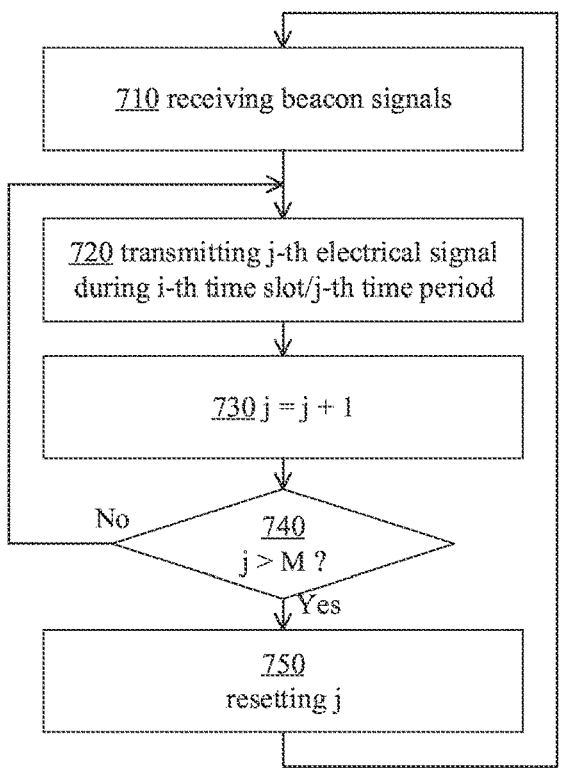
FIG. 7 depicts a stylus processing method 700 in accordance with an embodiment of the present invention.

Please refer to FIG. 7, which depicts a stylus processing method 700 in accordance with an embodiment of the present invention. The stylus processing method 700 may be applicable to the stylus 110 as shown in FIG. 3. In one embodiment, it may be a program stored in non-volatile memory and being executed by the processor 320. If there is no causal relation between any given two steps, the present invention does not limit execution order of these two steps.

The stylus processing method 700 begins with step 710 or 750. Embodiments as shown in FIGS. 4A-4D may be referenced herein. When the stylus processing method 700 is realized, two variables of positive integers, i and j, are maintained. The variable i denotes a number assigned to the stylus performing the stylus processing method 700, and the variable j denotes the sequential number of time period, where $1 \Leftarrow j \Leftarrow M$, M is a positive number equals to or being larger than 2. Initial value of the variable i may be set through a man-machine interface or after fabrication. Initial value of the variable j is 1.

Step 710: receiving beacon signals by the receiving circuit 360.

Step 720: transmitting j-th electrical signals by the transmitting circuit 350 during the i-th time slot of the j-th time period.

Step 730: increasing the value of the variable j by 1.

Step 740: determining whether the value of the variable j is larger than M. If so, it represents that M times of electrical signals are already sent, the flow proceeds to step 650. Otherwise, it implies that not all of M times of electrical signals are sent, the flow returns to step 720.

Step 750: resetting the value of the variable j to its initial value. Next, the flow returns to step 710.

Figure 8:
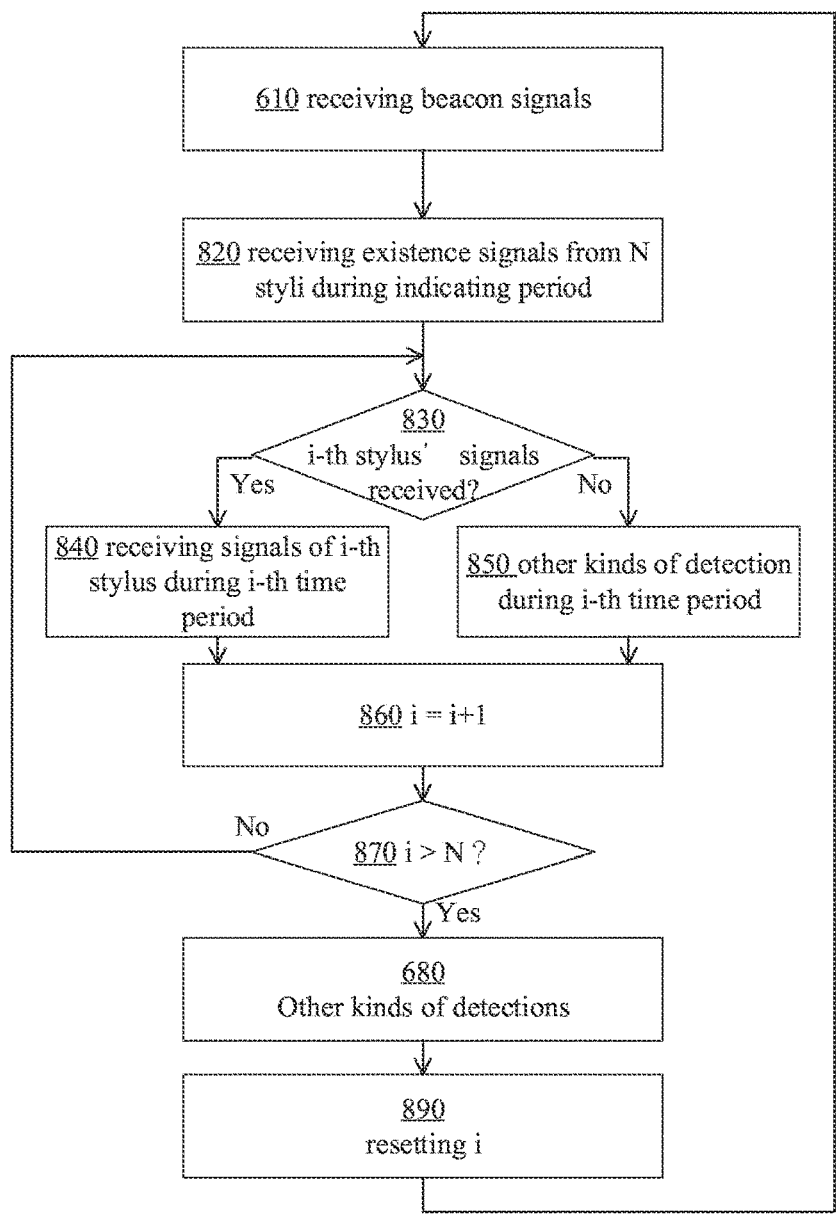
FIG. 8 depicts a flowchart diagram of a touch sensitive processing method 800 in accordance with an embodiment of the present invention.

Please refer to FIG. 8, which depicts a flowchart diagram of a touch sensitive processing method 800 in accordance with an embodiment of the present invention. The touch sensitive processing method 800 may be applied to the touch sensitive processing apparatus 130 as shown in FIG. 2. In one embodiment, it may be a program stored in non-volatile memory and being executed by the embedded processor 240. If there is no causal relation between any given two steps, the present invention does not limit execution order of these two steps.

The touch sensitive processing method 800 begins with step 610 or 890. Embodiments as shown in FIGS. 5A-5C may be referenced herein. When the touch sensitive processing method 800 is realized, a variable of positive integer, i, is maintained. The variable i denotes the sequential number of time period, where $1 \Leftarrow i \Leftarrow N$ and N is a positive number equals to or being larger than 2. Initial value of the variable i is 1. Steps 610 and 680 are already mentioned in the embodiment as shown in FIG. 6. No duplicated description is elaborated here.

Step 820: receiving sequentially existence signals corresponding N styli during an indicating time period by the sensing circuit 230. Next, the flow proceeds to step 830.

Step 830: determining whether the existence signals corresponding to the i-th stylus is received. If so, the flow proceeds to step 840. Otherwise, the flow proceeds to step 850.

Step 840: receiving electrical signals emitted from the i-th stylus during the i-th time period by the sensing circuit 230.

Step 850: performing other kinds of detections during the i-th time period.

Step 860: increasing the value of the variable i by 1.

Step 870: determining whether the value of the variable i is larger than N. If so, it represents that detection modes of the N time periods are already decided, the flow proceeds to step 680. Otherwise, the flow returns to step 830.

Step 890: resetting the value of the variable i to its initial value. Next, the flow returns to step 610.

Figure 9:
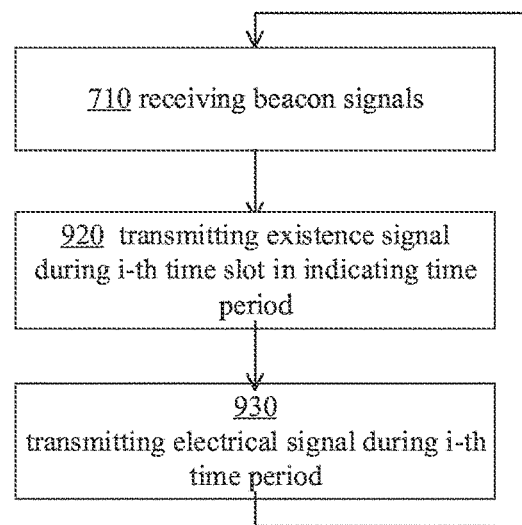
FIG. 9 depicts a stylus processing method 900 in accordance with an embodiment of the present invention.

Please refer to FIG. 9, which depicts a stylus processing method 900 in accordance with an embodiment of the present invention. The stylus processing method 900 may be applicable to the stylus 110 as shown in FIG. 3. In one embodiment, it may be a program stored in non-volatile memory and being executed by the processor 320. If there is no causal relation between any given two steps, the present invention does not limit execution order of these two steps.

The stylus processing method 900 begins with step 710. Embodiments as shown in FIGS. 5A-5C may be referenced herein. When the stylus processing method 900 is realized, a variable of positive integer, i, is maintained. The variable i denotes a positive integer assigned to the stylus performing the stylus processing method 900. Initial value of the variable i may be set through a man-machine interface or after fabrication. Step 710 is already mentioned in the embodiment as shown in FIG. 7. No duplicated description is elaborated here.

Step 920: transmitting an existence signal during an i-th time slot of an indicating time period. The existence signal may be transmitted via one or both of the ring electrode 395 and the tip electrode 390.

Step 930: transmitting electrical signals by the transmitting circuit 350 during an i-th time period. Next, the flow returns to step 710.

According to an embodiment of the present invention, a provided touch sensitive processing method comprising: transmitting beacon signals via touch electrodes of a touch panel; during a first time period after the transmitting of the beacon signals, receiving sequentially and respectively first electrical signals from N styli via the touch electrodes; when the first electrical signals of an i-th stylus among the N styli is received during the first time period, respectively receiving an j-th electrical signals of the i-th stylus via the touch electrodes during an i-th time slot of an j-th time period after the transmitting of the beacon signals; and when the first electrical signals of the i-th stylus among the N styli is received during the first time period, respectively performing other kinds of detections during the i-th time slot of the j-th time period, where $1 \Leftarrow i \Leftarrow N$, $2 \Leftarrow j \Leftarrow M$, N and M are positive integers equal to or larger than 2, i and j are positive integers.

In one embodiment, in order to conveniently calculate time length of the time slots, time lengths of the receiving of the first electrical signals through the M-th electrical signals are the same.

According to an embodiment of the present invention, a provided touch sensitive processing method comprising: transmitting beacon signals via touch electrodes of a touch panel; during an indicating time period after the transmitting of the beacon signals, receiving sequentially and respectively existence signals from N styli via the touch electrodes; when the existence signal of an i-th stylus among the N styli is received during the indicating time period, respectively receiving electrical signals of the i-th stylus during an i-th time period after the transmitting of the beacon signals; and when the existence signal of the i-th stylus is not received during the indicating time period, respectively performing other kinds of detections during the i-th time slot, where $1 \Leftarrow i \Leftarrow N$, N is a positive integer equal to or larger than 2, i is a positive integer.

In one embodiment, in order to reduce overhead caused by existence signals, time length of the receiving of existence signals is shorter than time length of the receiving of electrical signals.

In one embodiment, in order to let the touch sensitive processing system perform other functions, the other kinds of detections comprises one or any combination of following: detecting external conductive object; detecting whether conductive liquid cover large area of the touch panel; detecting environmental interference; and power-saving sleep.

In one embodiment, in order to utilize idle turnaround time period, the touch sensitive processing method further comprises performing other kinds of detections during a turnaround time period adjacent to two of the time slots or two of the time periods when other kinds of detections are performed during these two of the time slots or these two of the time periods.

According to an embodiment of the present invention, a provided touch sensitive processing apparatus, comprising: a driving circuit, configured for transmitting beacon signals via touch electrodes of a touch panel; a sensing circuit, configured for receiving electrical signals from a stylus via the touch electrodes; and an embedded processor, coupled to the driving circuit and the sensing circuit, configured for executing instructions stored in non-volatile memory in order to realize following steps: transmitting beacon signals via the touch electrodes by the driving circuit; during a first time period after the transmitting of the beacon signals, receiving sequentially and respectively first electrical signals from N styli via the touch electrodes by the sensing circuit; when the first electrical signals of an i-th stylus among the N styli is received during the first time period, respectively receiving an j-th electrical signals of the i-th stylus via the touch electrodes during an i-th time slot of an j-th time period after the transmitting of the beacon signals; and when the first electrical signals of the i-th stylus among the N styli is received during the first time period, respectively performing other kinds of detections during the i-th time slot of the j-th time period, where $1 \Leftarrow i \Leftarrow N$, $2 \Leftarrow j \Leftarrow M$, N and M are positive integers equal to or larger than 2, i and j are positive integers.

In one embodiment, in order to conveniently calculate time length of the time slots, time lengths of the receiving of the first electrical signals through the M-th electrical signals are the same.

According to an embodiment of the present invention, a provided touch sensitive processing apparatus, comprising: a driving circuit, configured for transmitting beacon signals via touch electrodes of a touch panel; a sensing circuit, configured for receiving electrical signals from a stylus via the touch electrodes; and an embedded processor, coupled to the driving circuit and the sensing circuit, configured for executing instructions stored in non-volatile memory in order to realize following steps: transmitting beacon signals via the touch electrodes by the driving circuit; during an indicating time period after the transmitting of the beacon signals, receiving sequentially and respectively existence signals from N styli via the touch electrodes by the sensing circuit; when the existence signal of an i-th stylus among the N styli is received during the indicating time period, respectively receiving electrical signals of the i-th stylus during an i-th time period after the transmitting of the beacon signals; and when the existence signal of the i-th stylus is not received during the indicating time period, respectively performing other kinds of detections during the i-th time slot, where $1 \Leftarrow i \Leftarrow N$, N is a positive integer equal to or larger than 2, i is a positive integer.

In one embodiment, in order to reduce overhead caused by existence signals, time length of the receiving of existence signals is shorter than time length of the receiving of electrical signals.

In one embodiment, in order to let the touch sensitive processing system perform other functions, the other kinds of detections comprises one or any combination of following: detecting external conductive object; detecting whether conductive liquid cover large area of the touch panel; detecting environmental interference; and power-saving sleep.

In one embodiment, in order to utilize idle turnaround time period, the embedded processor is further configured for performing other kinds of detections during a turnaround time period adjacent to two of the time periods when other kinds of detections are performed during these two of the time periods.

According to an embodiment of the present invention, a provided touch sensitive system, comprising: the aforementioned touch sensitive processing apparatus and the touch panel.

In one embodiment, in order to let the touch sensitive processing system perform other functions, the other kinds of detections comprises one or any combination of following: detecting external conductive object; detecting whether conductive liquid cover large area of the touch panel; detecting environmental interference; and power-saving sleep.

In one embodiment, in order to utilize idle turnaround time period, the embedded processor is further configured for performing other kinds of detections during a turnaround time period adjacent to two of the time periods when other kinds of detections are performed during these two of the time periods.

In summarized, the touch sensitive processing method, apparatus and touch sensitive system provided by the present application, in a cycle, is able to detect first electrical signals emitted from styli and to determine whether continues to detect follow-on electrical signals of a particular stylus during following time periods according to whether the particular stylus transmits the first electrical signals. If the first electrical signals of the particular stylus are not detected, it turns the time periods from for follow-on electrical signals detection to for other kinds of detections, in order to raise utilization rate of the touch sensitive system, for examples, increasing detection rate or report rate related to the external conductive object.

According to an embodiment of the present application, a provided stylus processing method, comprising: receiving beacon signals via a tip electrode of a stylus; and during an i-th time slot of an j-th time period after the beacon signals are received, transmitting an j-th electrical signals via the tip electrode, where $1 \Leftarrow j \Leftarrow M$, M is a positive integer equals to or larger than 2, j is a positive integer and i is a positive integer.

In one embodiment, in order to conveniently calculate time length of time slot, time lengths of the transmitting of the first electrical signals through the M-th electrical signals are the same.

According to an embodiment of the present application, a provided stylus processing method, comprising: receiving beacon signals via a tip electrode of a stylus; during an i-th time slot of an indicating time period after the beacon signals are received, transmitting an existence signal via the tip electrode; and during an i-th time period after the beacon signals are received, transmitting electrical signals via the tip electrode, where i is an positive integer.

In one embodiment, in order to reduce overhead caused by existence signals, time length of the receiving of existence signals is shorter than time length of the receiving of electrical signals.

In one embodiment, in order to let the touch sensitive processing apparatus to calculate a tilt angle of the stylus and to expand volumes of detecting electrical signals, the stylus processing method further comprises transmitting electrical signals via a ring electrode of the stylus, wherein the ring electrode is placed around the tip electrode and is insulated from the tip electrode.

According to an embodiment of the present application, a provided stylus, comprising: a tip electrode; a receiving circuit, coupled to the tip electrode for receiving beacon signals; a transmitting circuit, coupled to the tip electrode for transmitting electrical signal; and a processor, coupled to the receiving circuit and the transmitting circuit, configured for executing instructions stored in non-volatile memory for realizing following steps: receiving beacon signals via a tip electrode of a stylus; and during an i-th time slot of an j-th time period after the beacon signals are received, transmitting an j-th electrical signals via the tip electrode, where $1 \Leftarrow j \Leftarrow M$, M is a positive integer equals to or larger than 2, j is a positive integer and i is a positive integer.

In one embodiment, in order to conveniently calculate time length of time slot, time lengths of the transmitting of the first electrical signals through the M-th electrical signals are the same.

According to one embodiment of the present application, a provided stylus, comprising: a tip electrode; a receiving circuit, coupled to the tip electrode for receiving beacon signals; a transmitting circuit, coupled to the tip electrode for transmitting electrical signal; and a processor, coupled to the receiving circuit and the transmitting circuit, configured for executing instructions stored in non-volatile memory for realizing following steps: receiving beacon signals via a tip electrode of a stylus; during an i-th time slot of an indicating time period after the beacon signals are received, transmitting an existence signal via the tip electrode; and during an i-th time period after the beacon signals are received, transmitting electrical signals via the tip electrode, where i is an positive integer.

In one embodiment, in order to reduce overhead caused by existence signals, time length of the receiving of existence signals is shorter than time length of the receiving of electrical signals.

In one embodiment, in order to let the touch sensitive processing apparatus to calculate a tilt angle of the stylus and to expand volumes of detecting electrical signals, the stylus further comprises a ring electrode is placed around the tip electrode and is insulated from the tip electrode, wherein the transmitting circuit further transmits electrical signals via the ring electrode.

In summarized, the stylus and processing method thereof provided by the present application is capable of transmitting multiple times of electrical signals in a cycle such that the touch sensitive processing apparatus can determine whether it needs to detect follow-on electrical signals of the stylus in a later time period according to whether the first electrical signals of the stylus is received or not. If the first electrical signals of the stylus are not received, it turns the time period for the follow-on electrical signals detection to for other kinds of detections in order to increase utilization rate of the touch sensitive system, e.g., increase detection rate or report rate with regard to external conductive objects.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A touch sensitive processing method, comprising:
   transmitting beacon signals via touch electrodes of a touch panel;
   during N time slots of a first time period after the transmitting of the beacon signals, receiving sequentially and respectively first electrical signals from N styli via the touch electrodes;
   when the first electrical signals of an i-th stylus among the N styli is received during the i-th time slot of the first time period, respectively receiving an j-th electrical signals of the i-th stylus via the touch electrodes during an i-th time slot of an j-th time period after the transmitting of the beacon signals; and
   when the first electrical signals of the i-th stylus among the N styli is received during the i-th time slot of the first time period, respectively performing other kinds of detections during the i-th time slot of the j-th time period,
   where $1 \Leftarrow i \Leftarrow N$, $2 \Leftarrow j \Leftarrow M$, N and M are positive integers equal to or larger than 2, i and j are positive integers.

2. The touch sensitive processing method as claimed in claim 1, wherein time lengths of the receiving of the first electrical signals through the M-th electrical signals are the same.

3. The touch sensitive processing method as claimed in claim 1, wherein the other kinds of detections comprise one or any combination of following:
   detecting external conductive object;
   detecting whether conductive liquid cover large area of the touch panel;
   detecting environmental interference; and
   power-saving sleep.

4. The touch sensitive processing method as claimed in claim 1, further comprises performing other kinds of detections during a turnaround time period adjacent to two of the time slots or two of the time periods when other kinds of detections are performed during these two of the time slots or these two of the time periods.

5. A touch sensitive processing method, comprising:
   transmitting beacon signals via touch electrodes of a touch panel;
   during N time slots of an indicating time period after the transmitting of the beacon signals, receiving sequentially and respectively existence signals from N styli via the touch electrodes;
   when the existence signal of an i-th stylus among the N styli is received during the i-th time slot of the indicating time period, respectively receiving electrical signals of the i-th stylus during an i-th time period after the transmitting of the beacon signals; and
   when the existence signal of the i-th stylus is not received during the i-th time slot of the indicating time period, respectively performing other kinds of detections during the i-th time slot,
   where $1 \Leftarrow i \Leftarrow N$, N is a positive integer equal to or larger than 2, i is a positive integer.

6. The touch sensitive processing method as claimed in claim 5, wherein time length of the receiving of existence signals is shorter than time length of the receiving of electrical signals.

7. The touch sensitive processing method as claimed in claim 5, wherein the other kinds of detections comprise one or any combination of following:
   detecting external conductive object;
   detecting whether conductive liquid cover large area of the touch panel;
   detecting environmental interference; and
   power-saving sleep.

8. The touch sensitive processing method as claimed in claim 5, further comprises performing other kinds of detections during a turnaround time period adjacent to two of the time periods when other kinds of detections are performed during these two of the time periods.

9. A touch sensitive processing apparatus, comprising:
   a driving circuit, configured for transmitting beacon signals via touch electrodes of a touch panel;
   a sensing circuit, configured for receiving electrical signals from a stylus via the touch electrodes; and
   an embedded processor, coupled to the driving circuit and the sensing circuit, configured for executing instructions stored in non-volatile memory in order to realize following steps:
   transmitting beacon signals via the touch electrodes by the driving circuit;
   during N time slots of a first time period after the transmitting of the beacon signals, receiving sequentially and respectively first electrical signals from N styli via the touch electrodes by the sensing circuit;
   when the first electrical signals of an i-th stylus among the N styli is received during the i-th time slot of the first time period, respectively receiving an j-th electrical signals of the i-th stylus via the touch electrodes during an i-th time slot of an j-th time period after the transmitting of the beacon signals; and
   when the first electrical signals of the i-th stylus among the N styli is received during the i-th time slot of the first time period, respectively performing other kinds of detections during the i-th time slot of the j-th time period, where $1 \Leftarrow i \Leftarrow N$, $2 \Leftarrow j \Leftarrow M$, N and M are positive integers equal to or larger than 2, i and j are positive integers.

10. The touch sensitive processing apparatus as claimed in claim 9, wherein time lengths of the receiving of the first electrical signals through the M-th electrical signals are the same.

11. The touch sensitive processing apparatus as claimed in claim 9, wherein the other kinds of detections comprise one or any combination of following:
    detecting external conductive object;
    detecting whether conductive liquid cover large area of the touch panel;
    detecting environmental interference; and
    power-saving sleep.

12. The touch sensitive processing apparatus as claimed in claim 9, wherein the embedded processor is further configured for performing other kinds of detections during a turnaround time period adjacent to two of the time slots or two of the time periods when other kinds of detections are performed during these two of the time slots or these two of the time periods.

13. A touch sensitive processing apparatus, comprising:
    a driving circuit, configured for transmitting beacon signals via touch electrodes of a touch panel;
    a sensing circuit, configured for receiving electrical signals from a stylus via the touch electrodes; and
    an embedded processor, coupled to the driving circuit and the sensing circuit, configured for executing instructions stored in non-volatile memory in order to realize following steps:
    transmitting beacon signals via the touch electrodes by the driving circuit;
    during N time slots of an indicating time period after the transmitting of the beacon signals, receiving sequentially and respectively existence signals from N styli via the touch electrodes by the sensing circuit;
    when the existence signal of an i-th stylus among the N styli is received during the i-th time slot of the indicating time period, respectively receiving electrical signals of the i-th stylus during an i-th time period after the transmitting of the beacon signals; and
    when the existence signal of the i-th stylus is not received during the i-th time slot of the indicating time period, respectively performing other kinds of detections during the i-th time slot,
    where $1 \Leftarrow i \Leftarrow N$, N is a positive integer equal to or larger than 2, i is a positive integer.

14. The touch sensitive processing apparatus as claimed in claim 13, wherein time length of the receiving of existence signals is shorter than time length of the receiving of electrical signals.

15. The touch sensitive processing apparatus as claimed in claim 13, wherein the other kinds of detections comprise one or any combination of following:
    detecting external conductive object;
    detecting whether conductive liquid cover large area of the touch panel;
    detecting environmental interference; and
    power-saving sleep.

16. The touch sensitive processing apparatus as claimed in claim 13, wherein the embedded processor is further configured for performing other kinds of detections during a turnaround time period adjacent to two of the time periods when other kinds of detections are performed during these two of the time periods.

17. A touch sensitive system, comprising:
    the touch sensitive processing apparatus and the touch panel recited in claim 9.

18. The touch sensitive system as claimed in claim 17, further comprises at least one stylus among the N styli.

19. The touch sensitive system as claimed in claim 17, wherein the other kinds of detections comprise one or any combination of following:
    detecting external conductive object;
    detecting whether conductive liquid cover large area of the touch panel;
    detecting environmental interference; and
    power-saving sleep.

20. The touch sensitive system as claimed in claim 17, wherein the embedded processor is further configured for performing other kinds of detections during a turnaround time period adjacent to two of the time slots or two of the time periods when other kinds of detections are performed during these two of the time slots or two of the time periods.

21. A touch sensitive system, comprising:
    the touch sensitive processing apparatus and the touch panel recited in claim 13.

22. The touch sensitive system as claimed in claim 21, further comprises at least one stylus among the N styli.

23. The touch sensitive system as claimed in claim 21, wherein the other kinds of detections comprise one or any combination of following:
    detecting external conductive object;
    detecting whether conductive liquid cover large area of the touch panel;
    detecting environmental interference; and
    power-saving sleep.

24. The touch sensitive system as claimed in claim 21, wherein the embedded processor is further configured for performing other kinds of detections during a turnaround time period adjacent to two of the time periods when other kinds of detections are performed during these two of the time periods.

* * * * *